(12) United States Patent
Zhang et al.

(10) Patent No.: US 10,344,581 B2
(45) Date of Patent: Jul. 9, 2019

(54) USE OF NATURAL LOW-LEVEL RADIOACTIVITY OF RAW MATERIALS TO EVALUATE GRAVEL PACK AND CEMENT PLACEMENT IN WELLS

(71) Applicant: CARBO CERAMICS, INC., Houston, TX (US)

(72) Inventors: Qianmei Zhang, Katy, TX (US); Harry D. Smith, Jr., Spring, TX (US)

(73) Assignee: CARBO CERAMICS INC., Houston, TX (US)

( * ) Notice: Subject to any disclaimer, the term of this patent is extended or adjusted under 35 U.S.C. 154(b) by 202 days.

(21) Appl. No.: 15/148,618

(22) Filed: May 6, 2016

(65) Prior Publication Data

US 2016/0326865 A1 Nov. 10, 2016

Related U.S. Application Data

(60) Provisional application No. 62/158,372, filed on May 7, 2015.

(51) Int. Cl.
*E21B 47/00* (2012.01)
*G01V 5/06* (2006.01)

(52) U.S. Cl.
CPC ........... *E21B 47/0005* (2013.01); *G01V 5/06* (2013.01)

(58) Field of Classification Search
CPC ...... E21B 47/0005; E21B 33/14; E21B 43/04; G01V 5/06; G01V 5/04; G01V 5/10
See application file for complete search history.

(56) References Cited

U.S. PATENT DOCUMENTS 4,423,323 A 12/1983 Ellis et al.
4,587,423 A 5/1986 Boyce
(Continued)

FOREIGN PATENT DOCUMENTS

EP 0388265 A1 9/1990
WO 2011/127156 A2 10/2011
WO 2013044300 A1 4/2013

OTHER PUBLICATIONS

International Search Report and Written Opinion for International Application No. PCT/US16/31256 dated Oct. 17, 2016.
(Continued)

*Primary Examiner* — Michael R Wills, III
(74) *Attorney, Agent, or Firm* — Patterson + Sheridan, LLP

(57) ABSTRACT

Methods for logging a well utilizing natural radioactivity originating from clay based particulates are disclosed. The methods can include utilizing a gravel pack slurry containing a liquid and gravel pack particles to hydraulically place the particles into a gravel pack zone of a borehole penetrating a subterranean formation and obtaining a post gravel pack data set by lowering into the borehole traversing the subterranean formation a gamma ray detector and detecting gamma rays resulting from a native radioactivity of the gravel pack particles. The methods can further include using the post gravel pack data set to determine a location of the gravel pack particles and correlating the location of the gravel-pack particles to a depth measurement of the borehole to determine the location, height, and/or percent fill of gravel-pack particles placed in the gravel pack zone of the borehole.

18 Claims, 2 Drawing Sheets

(56) References Cited

U.S. PATENT DOCUMENTS

| | | | | |
|---|---|---|---|---|
| 4,950,892 | A | 8/1990 | Olesen | |
| 5,243,190 | A * | 9/1993 | Bandy | C09K 8/80 |
| | | | | 250/259 |
| 5,578,820 | A * | 11/1996 | Gadeken | G01V 5/06 |
| | | | | 250/256 |
| 7,202,478 | B2 * | 4/2007 | Ramsden | G01T 1/20 |
| | | | | 250/361 R |
| 8,915,310 | B2 | 12/2014 | Flusche | |
| 2003/0225531 | A1 * | 12/2003 | Lingren | G01N 23/2255 |
| | | | | 702/23 |
| 2013/0292109 | A1 | 11/2013 | Smith, Jr. et al. | |
| 2013/0345983 | A1 * | 12/2013 | Guo | G01V 5/104 |
| | | | | 702/8 |
| 2014/0034823 | A1 * | 2/2014 | Hyde-Barber | C04B 28/02 |
| | | | | 250/269.4 |

OTHER PUBLICATIONS

Office Action for Columbian Application No. NC2017/0011619 dated Dec. 12, 2017.
Extended European Search Report for European Application No. 16790174.3 dated Mar. 25, 2019.
Communication pursuant to Rules 70(2) and 70a(2) EPC for European Application No. 16790174.3 dated Apr. 11, 2019.

* cited by examiner

US 10,344,581 B2

USE OF NATURAL LOW-LEVEL RADIOACTIVITY OF RAW MATERIALS TO EVALUATE GRAVEL PACK AND CEMENT PLACEMENT IN WELLS

FIELD

The present invention relates to gravel packing and cementing operations, and more specifically to methods for identifying gravel pack or cement material in the vicinity of a borehole using gamma ray detectors.

BACKGROUND

There have been many nuclear logging technologies utilized in oil and gas wells in the past to evaluate the placement of gravel placed in a gravel packed interval of a wellbore, and cement placed in the annulus either between casing strings or between an outer casing and the borehole wall. Gravel pack evaluation oftentimes includes: (1) neutron or gamma ray count rates in conventional neutron logging tools employing neutron sources, (2) count rates and density measurements from gamma ray detectors in density-based logging tools with gamma ray sources, (3) detector count rates, silicon yields, and borehole capture cross section measurements from pulsed neutron logging tools, (4) gamma ray count rates from radioactive tracers (generated in a nuclear reactor) mixed and pumped downhole with the gravel pack material, and (5) yield and/or attenuation measurements from non-radioactive tracers added to, or integrated into, pack solids subsequently detected by neutron or pulsed neutron logging tools. Many of these nuclear technologies (in addition to conventional acoustic source-receiver based cement evaluation tools) have also been used to evaluate downhole cement placement. All of these techniques involve the use of fairly sophisticated logging tools using nuclear or acoustic sources, and in many cases, also involve the addition of radioactive or non-radioactive tracers to the gravel pack and cement slurries being pumped downhole. The use of tracers and/or sophisticated logging tools can add to the overall cost of a well.

There is a need, therefore, for a logging technique that does not require the use of sophisticated logging tools containing nuclear or acoustic sources. There is also a need for a logging technique that does not require the addition of tracers or tracer material to gravel pack or cement slurries.

DETAILED DESCRIPTION

Figure 1:
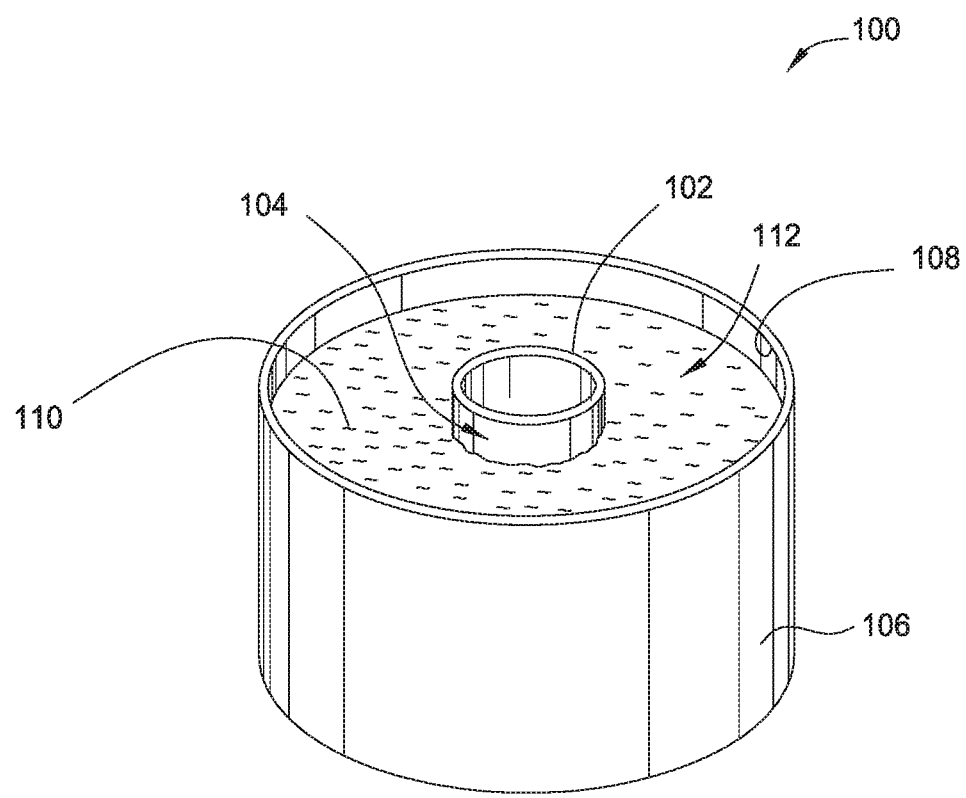
FIG. 1 is a perspective view of an exemplary gamma ray calibrator.

Sand and/or ceramic proppant is oftentimes used in gravel packs. One method of evaluating gravel pack quality includes using a silicon activation log measured by a pulsed neutron tool. Gravel pack quality can also be evaluated by utilizing proppant (or other pack solids) tagged with a non-radioactive tracer (NRT) containing a high thermal neutron capture cross section material, and then evaluating changes in the borehole capture cross section (sigma) log, the detector count rate log, and/or the non-radioactive tracer yield log (such as a gadolinium yield log), where the non-radioactive tracer/tag is integrated into the proppant.

Ordinary ceramic proppant is oftentimes made from clay, which can contain small amounts of the naturally occurring radioactive elements (such as uranium, thorium and potassium, and their decay products, including radium). As such, ceramic proppant can have a significant naturally occurring radioactivity relative to either the other solids in gravel packs or the natural gamma background coming from the downhole formations. When ceramic proppant or a mixture of ceramic proppant and (essentially non-radioactive) sand are used as gravel pack solids, the natural gamma ray log reading can increase due to the significant amount of gamma activity coming from the ceramic material in the gravel pack zone, which is in close proximity to the logging tool.

It has been discovered that certain solids suitable for placement in a downhole subterranean environment can contain enough natural radioactive impurities to enable a comparison of gamma ray logs before and after solids placement to detect an increase in natural gamma radioactivity originating from the solids placed downhole. In one or more exemplary embodiments, a gravel pack or cement slurry can include the naturally radioactive solids. The detection of natural gamma radioactivity originating from the solids can be used to detect a gravel pack or cement. In one or more exemplary embodiments, the pre- and post-solids placement gamma ray logs can be normalized prior to evaluating an increase in the post-placement log relative to the pre-placement log.

The solids can include any ceramic particulate material. For example, the solids can include gravel pack particles having a ceramic material. The gravel pack particles can be formed from a raw material having a natural or native radioactivity, such as clays including, but not limited to, kaolin, bauxite and the like. In one or more exemplary embodiments, the gravel pack particles can be or include any suitable ceramic proppant. The gravel pack particles can be or include silica and/or alumina in any suitable amounts. According to several exemplary embodiments, the gravel pack particles include less than or equal to 100 wt %, less than 80 wt %, less than 60 wt %, less than 40 wt %, less than 30 wt %, less than 20 wt %, less than 10 wt %, or less than 5 wt % silica based on the total weight of the gravel pack particles. According to several exemplary embodiments, the gravel pack particles include at least about 30 wt %, at least about 50 wt %, at least about 60 wt %, at least about 70 wt %, at least about 80 wt %, at least about 90 wt %, or at least about 95 wt % alumina based on the total weight of the gravel pack particles. In one or more exemplary embodiments, the gravel pack particles can be or include sand.

According to several exemplary embodiments, the gravel pack particles disclosed herein include proppant particles that are substantially round and spherical having a size in a range between about 6 and 270 U.S. Mesh. For example, the size of the particles can be expressed as a grain fineness number (GFN) in a range of from about 15 to about 300, or from about 30 to about 110, or from about 40 to about 70. According to such examples, a sample of sintered particles can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

According to several exemplary embodiments of the present invention, the ceramic proppant disclosed herein can be or include conventional proppant. Such conventional proppant can be manufactured according to any suitable process including, but not limited to continuous spray atomization, spray fluidization, spray drying, or compression. Suitable conventional proppants and methods for their manufacture are disclosed in U.S. Pat. Nos. 4,068,718, 4,427,068, 4,440,866, 4,522,731, 4,623,630, 4,658,899, 5,188,175, 8,865,693, 8,883,693 and 9,175,210, the entire disclosures of which are incorporated herein by reference. The ceramic proppants can also be manufactured in a manner that creates porosity in the proppant grain. A process to manufacture a suitable porous ceramic proppant is described in U.S. Pat. No. 7,036,591, the entire disclosure of which is incorporated herein by reference.

The gravel pack particles can also include a thermal neutron absorbing material. The thermal neutron absorbing material can be boron, cadmium, gadolinium, samarium, iridium, or mixtures thereof. Suitable boron containing high capture cross-section materials include boron carbide, boron nitride, boric acid, high boron concentrate glass, zinc borate, borax, and combinations thereof. A proppant containing 0.1% by weight of boron carbide has a macroscopic capture cross-section of approximately 92 capture units. A suitable proppant containing 0.025-0.030% by weight of gadolinium oxide has similar thermal neutron absorption properties as a proppant containing 0.1% by weight of boron carbide. According to other embodiments of the present invention, at least a portion of the proppant utilized includes about 0.025% to about 4.0% by weight of the thermal neutron absorbing material. According to certain embodiments of the present invention, the proppant containing the thermal neutron absorbing material includes a concentration of about 0.01%, about 0.05%, or about 0.1% to about 2.0%, about 3.0%, or about 4.0% by weight of a boron compound thermal neutron absorbing material. According to certain embodiments of the present invention, the proppant containing the thermal neutron absorbing material includes a concentration of about about 0.01% or about 0.025% to about 0.5% or about 1.0% by weight of a gadolinium compound thermal neutron absorbing material.

The term "cement," as used herein, can refer to any suitable hydraulic cement. The hydraulic cement can be or include any suitable matter, such as calcium, aluminum, silicon, oxygen, and/or sulfur, which sets and hardens by reaction with water. Such hydraulic cements include, but are not limited to, Portland cements, pozzolanic cements, gypsum cements, high alumina content cements, silica cements, combinations thereof, and the like. In one or more exemplary embodiments, the cement material can be or include a native or natural radioactivity. For example, the cement can be formed from a raw material having a natural or native radioactivity, such as a clay including, but not limited to, kaolin, bauxite and the like.

In one or more exemplary embodiments, the cement can be mixed with water to form a cement slurry for placement in a wellbore or annulus. In one or more exemplary embodiments, the cement slurry can contain water and cement in any suitable amounts. The cement slurry can have a cement concentration of about 1 wt % to about 20 wt %.

In one or more exemplary embodiments, the cement can be mixed with water and gravel pack particles and/or proppant particles to form a cement slurry for placement in a wellbore or annulus. In one or more exemplary embodiments, the cement slurry can contain water, cement and proppant particles in any suitable amounts. The cement slurry can have a cement concentration of about 1 wt % to about 20 wt % and a proppant concentration of about 5 wt % to about 70 wt %.

The gravel pack particles and/or cement material can be free of any thermal neutron absorbing material. In one or more exemplary embodiments, the gravel pack particles and/or cement material do not contain boron, cadmium, gadolinium, samarium, iridium, or any combinations or mixtures thereof.

Well site gravel packing operations can include blending water with proppant or gravel pack particles to provide a gravel pack slurry, which can then be pumped down a well. The gravel pack slurry is forced into a gravel pack region of a wellbore containing a gravel pack screen, resulting in a gravel pack placed between the screen and the casing. Well site cementing operations can include blending water with cementitious compositions to provide a slurry, which can then be pumped down a well. The slurry can also include or be mixed with proppant or gravel pack particles prior to being pumped down the well. The slurry is forced into an annular space between the casing and the formation and/or an annular space between two strings of casing.

Once the gravel pack and/or cement slurry is placed downhole, a gamma ray detector can be lowered down the wellbore for detection of the gravel pack and/or cement. The gamma ray detector can be incorporated into or can itself be any suitable downhole tool. Examples of downhole tools suitable for detecting gravel packs and cement as disclosed herein include but are not limited to logging-while-drilling (LWD) tools, measurement-while-drilling (MWD) tools, pulsed neutron capture (PNC) logging tools, compensated neutron tools, acoustic tools, density tools, directional drilling tools, drilling tools, fishing tools, formation evaluation tools, gamma density tools, gamma ray tools, gravity tools, magnetic resonance tools, monitoring tools, mud logging tools, neutron gamma density tools, nuclear tools, perforating tools, porosity tools, reservoir characterization tools, reservoir fluid sampling tools, reservoir pressure tools, reservoir solid sampling tools, resistivity tools, seismic tools, stimulation tools, surveying tools and/or telemetry tools, although other downhole tools are also within the scope of the present disclosure.

In gravel packing applications, a percentage fill of gravel pack particles in an annulus formed between an inner surface of a casing and an outer surface of a screen can be estimated in at least two methods. In the first method, gamma rays originating from two or more intervals of a gravel pack region of a wellbore are observed. The interval having the maximum increase in gamma rays observed can be indicative of 100% fill, then the percentage fill in other intervals can be estimated using the percentage increase in natural gamma activity in these other intervals relative to the maximum observed (the relationship, to a first approximation, can be linear (i.e., half the gamma ray log increase equals a half filled annulus). Alternatively, a non-linear relationship can be developed from laboratory measurements or computer modeling. In cementing applications, the method can be similar to that of the gravel packing applications, with the increase in gamma ray log count rates related directly to the percentage fill of cement in the annular space between casings, or to the volume of cement in a borehole annulus between an outer wall of a casing and the formation.

According to one or more exemplary embodiments, the gravel packed interval identification process using measurements from a logging tool having a gamma ray detector includes:

1. Preparing a plurality of gravel pack particles. The gravel pack particles can be or include any of the gravel pack particles disclosed herein. For example, the gravel pack particles can be formed from a raw material having a natural or native radioactivity, such as clays including, but not limited to, kaolin, bauxite and the like. In one or more exemplary embodiments, the gravel pack particles can be or include any suitable ceramic proppant having any suitable silica and/or alumina content.

2. Running and recording, or otherwise obtaining, a pre gravel pack gamma ray log across the potential zone(s) to be gravel packed to obtain a pre gravel pack data set, and preferably also including zones outside the potential gravel pack zones.

3. Conducting a gravel packing operation in the well, incorporating the gravel pack particles into the slurry pumped downhole. The slurry pumped downhole can have any suitable solids content and the total combined solids in the slurry can have any suitable gravel pack particles concentration. The solids content of the slurry can have a gravel pack particle concentration of at least about 50 wt %, at least about 65 wt %, at least about 75 wt %, at least about 85 wt %, at least about 95 wt %, at least about 99 wt % or about 100 wt % based on the total combined weight of the solids in the slurry on a dry basis.

4. Running and recording a post gravel packing gamma ray log, if possible utilizing the same tool type as used in the pre gravel pack log, across the potential zones of interest, including one or more gravel pack intervals to obtain a post gravel pack data set, and preferably also including zones outside the interval where gravel packing was anticipated. The logs may be run with the tool centered or eccentered within the casing or tubing. The pre gravel pack and post gravel pack logs are preferably run in the same condition of eccentricity.

5. Comparing the pre gravel pack and post gravel pack data sets from the pre gravel pack and post gravel pack logs (after any log normalization), to determine location of gravel pack particles in two or more depth intervals of the wellbore. Normalization may be necessary if the pre gravel pack and post gravel pack logs were run with different borehole conditions, or if different tools or sources were used. This may be especially true if the pre gravel pack log was recorded at an earlier time in the life history of the well, using wireline, memory, and/or logging-while-drilling (LWD) sensors. Normalization procedures compare the log data from zones preferably outside of the possibly packed intervals in the pre gravel pack and post gravel pack logs. Since these zones have not changed between the logs, the gains and/or offsets are applied to the logs to bring about agreement between the pre gravel pack and post gravel pack logs in these normalization intervals. The same gains/offsets are then applied to the logs over the entire logged interval. Differences in the data indicate the presence of the gravel pack particles in the gravel packed annular region of the borehole.

6. Detecting a location, height, and/or percent fill of gravel pack particles placed in the annular region of the borehole by identifying an interval having the maximum increase in observed gamma rays as being indicative of 100% fill and estimating a percent fill in the remaining intervals using any increase observed natural gamma activity in any other depth intervals as a percentage to the observed increase natural gamma activity of the interval characterized as being 100% filled.

Further embodiments of the present disclosure include changes in the methods described herein such as, but not limited to, incorporating multiple pre gravel pack logs into any pre gravel pack versus post gravel pack comparisons, or the use of a simulated log for the pre gravel pack log (such simulated logs being obtained for instance using neural networks to generate simulated gamma ray log responses from other open or cased hole logs on the well), or the use of multiple stationary logging measurements instead of, or in addition to, data collected with continuous logs.

According to one or more exemplary embodiments, a cement interval identification process using measurements from a logging tool having a gamma ray detector includes:

1. Preparing a plurality of cement particles. The cement particles can be or include any of the gravel pack particles or proppant disclosed herein. For example, the cement particles can be formed from a raw material having a natural or native radioactivity, such as clays including, but not limited to, kaolin, bauxite and the like. In one or more exemplary embodiments, the cement particles can be or include any suitable ceramic proppant having any suitable silica and/or alumina content.

2. Running and recording, or otherwise obtaining, a pre cement gamma ray log across the potential zone(s) to be cemented to obtain a pre cement data set, and preferably also including zones outside the potential cemented zones.

3. Conducting a cementing operation in the well, incorporating the cement particles into the slurry pumped downhole. The slurry pumped downhole can have any suitable solids content and the total combined solids in the slurry can have any suitable cement particles concentration. The solids content of the slurry can have a cement particle concentration of at least about 50 wt %, at least about 65 wt %, at least about 75 wt %, at least about 85 wt %, at least about 95 wt %, at least about 99 wt % or about 100 wt % based on the total combined weight of the solids in the slurry on a dry basis.

4. Running and recording a post cement gamma ray log, if possible utilizing the same tool type as used in the pre cement log, across the potential zones of interest, including one or more cement intervals to obtain a post cement data set, and preferably also including zones outside the interval where cementing was anticipated. The logs may be run with the tool centered or eccentered within the casing or tubing. The pre cement and post cement logs are preferably run in the same condition of eccentricity.

5. Comparing the pre cement and post cement data sets from the pre cement and post cement logs (after any log normalization), to determine location of cement particles in two or more depth intervals of the wellbore. Normalization may be necessary if the pre cement and post cement logs were run with different borehole conditions, or if different tools or sources were used. This may be especially true if the pre cement log was recorded at an earlier time in the life history of the well, using wireline, memory, and/or logging-while-drilling (LWD) sensors. Normalization procedures compare the log data from zones preferably outside of the possibly cemented intervals in the pre cement and post cement logs. Since these zones have not changed between the logs, the gains and/or offsets are applied to the logs to bring about agreement between the pre cement and post cement logs in these normalization intervals. The same gains/offsets are then applied to the logs over the entire logged interval. Differences in the data indicate the presence of the cement particles in the cemented annular region of the borehole.

6. Detecting a location, height, and/or percent fill of cement particles placed in the annular region of the borehole by identifying an interval having the maximum increase in observed gamma rays as being indicative of 100% fill and estimating a percent fill in the remaining intervals using any increase observed natural gamma activity in any other depth intervals as a percentage to the observed increase natural gamma activity of the interval characterized as being 100% filled.

Further embodiments of the present invention include changes in the methods described herein such as, but not limited to, incorporating multiple pre cement logs into any pre cement versus post cement comparisons, or the use of a simulated log for the pre cement log (such simulated logs being obtained for instance using neural networks to generate simulated gamma ray log responses from other open or cased hole logs on the well), or the use of multiple stationary logging measurements instead of, or in addition to, data collected with continuous logs.

A second method disclosed herein of estimating percentage fill utilizes a more sophisticated calibration method. In one or more exemplary embodiments, a pre-determined relationship is developed between: (a) the observed count rate in a gamma ray detector assembly or probe placed in a cavity in a calibrator, with the remainder of the calibrator filled with the radioactive solids to be pumped downhole, and (b) the observed gamma log increase between pre-pack and post-pack gamma logs in a given known gravel pack geometry downhole in a 100% packed interval (as determined from other GP evaluation methods). Alternatively, the relationship can be determined from the calibrator count rate compared with a gamma log count rate from a logging tool utilized to detect the count rate from a gravel pack annulus in a laboratory test formation setup. A user can then predict from the gamma ray count rate in the calibrator filled with an unknown sample of naturally radioactive pack material, how much increase would be expected in a 100% packed interval if that pack material were used in a downhole gravel pack in a same or similar pack geometry. A user can also use the calibrator measurements to estimate, based on modeling (or developing corresponding pre-determined relationships determined in other gravel pack geometries), percentage fill for the unknown radioactive pack material when used in these other downhole gravel pack geometries. Similar processes can be developed for evaluating cement slurries using the calibrator filled with cement or cement solids.

FIG. 1 depicts an exemplary gamma ray calibrator 100. The calibrator 100 can include an inner tubing 102 having an outer surface 104 and an outer tubing 106 having an inner surface 108. As depicted in FIG. 1, an annular space 110 exists between the outer surface 104 of the inner tubing 102 and the inner surface 108 of the outer tubing 106. The gravel pack particles, proppant particles, proppant ore, gravel pack particle ore, or cement (sample 112) can fill at least a portion of the annular space 110. A gamma ray scintillation meter (not shown) can be placed within the inner tubing 102 to collect gamma ray counts originating from the sample occupying the annular space 110. A gamma ray calibration source (not shown) emitting a known level of gamma rays can be used to "calibrate" the gamma ray meter used in the calibrator 100.

In one or more exemplary embodiments, a calibrator procedure for a gravel packing or cementing application includes: (1) taking a first reading of the gamma ray meter with the calibrator 100 empty of all sources in order to detect the ambient background radioactivity; (2) positioning the calibration source adjacent an outer surface of the outer tubing 106, with the calibrator 100 still empty, to calibrate the gamma ray meter counting efficiency to the known strength of the calibration source (including subtracting natural background, which should be very low); and (3) removing the calibration source and filling the chamber with the sample 112. The first sample or two can be from batches of known gravel pack particles used in a new well, where a known increase in API gamma log counts coming from a 100% filled interval of a gravel pack screen has been observed. After subtracting natural background, the meter reading will approximately determine for this known fill material a conversion factor between meter reading and API gamma counts in the well that would be coming from the fill material. This process can be repeated for a second known well with the same or similar borehole geometry as that of the first well to confirm that the same conversion factor was obtained. The calibration procedure further includes: (4) using MCNP modeling to compare the count rate results for different gravel pack geometries to get conversion factors for each common gravel pack screen/casing geometry.

After this initial procedure is completed and validated, an unknown radioactive proppant or proppant ore (or cement or cement solids) scheduled to be used in an upcoming well can be processed through the calibrator 100, and the meter reading taken. Then, based on the meter reading and the borehole geometry in the upcoming well, the conversion factor can be used to predict how much increase in gamma log API readings (above a pre-placement gamma ray log reading) should result if there is 100% gravel pack (or cement) in the annulus between tubulars. One could then linearly scale for percentage fill (e.g., half the gamma increase=50% fill). If the linear scaling approximation proves not to be sufficiently accurate, modeling and/or experimentation can be used to develop a non-linear relationship between percentage gamma increase and percentage fill. In a cementing or open hole gravel pack application, with cement or pack material placed between the outer tubular and borehole wall, the gamma increase would be directly related to the cement or pack volume in the tubular-borehole annular space.

It should also be mentioned that the calibrator 100 can also simply be used in the field or at a proppant or cement processing plant to evaluate proppant, cement, or ore samples to predict the effect, if any, they would have on gamma logs in wells. That information can assist in determining what ores to source, or proppants or cements to make or use, in specific downhole applications.

In some embodiments, the operating company may not want excess natural gamma radioactivity in selected wells after packing or cementing procedures (perhaps in order to more easily detect radioactive salts deposited in perforations or in the cement annulus caused by water production or channeling). In such embodiments, the calibrator could be used to screen the pack or cement solids to be used to eliminate batches with excess natural radioactivity.

The following example is included to demonstrate illustrative embodiments of the present disclosure. It will be appreciated by those of ordinary skill in the art that the techniques disclosed in this example are merely illustrative and are not limiting. Indeed, those of ordinary skill in the art should, in light of the present disclosure, appreciate that many changes can be made in the specific embodiments that are disclosed, and still obtain a like or similar result without departing from the spirit and scope of the invention.

Example

Figure 2:
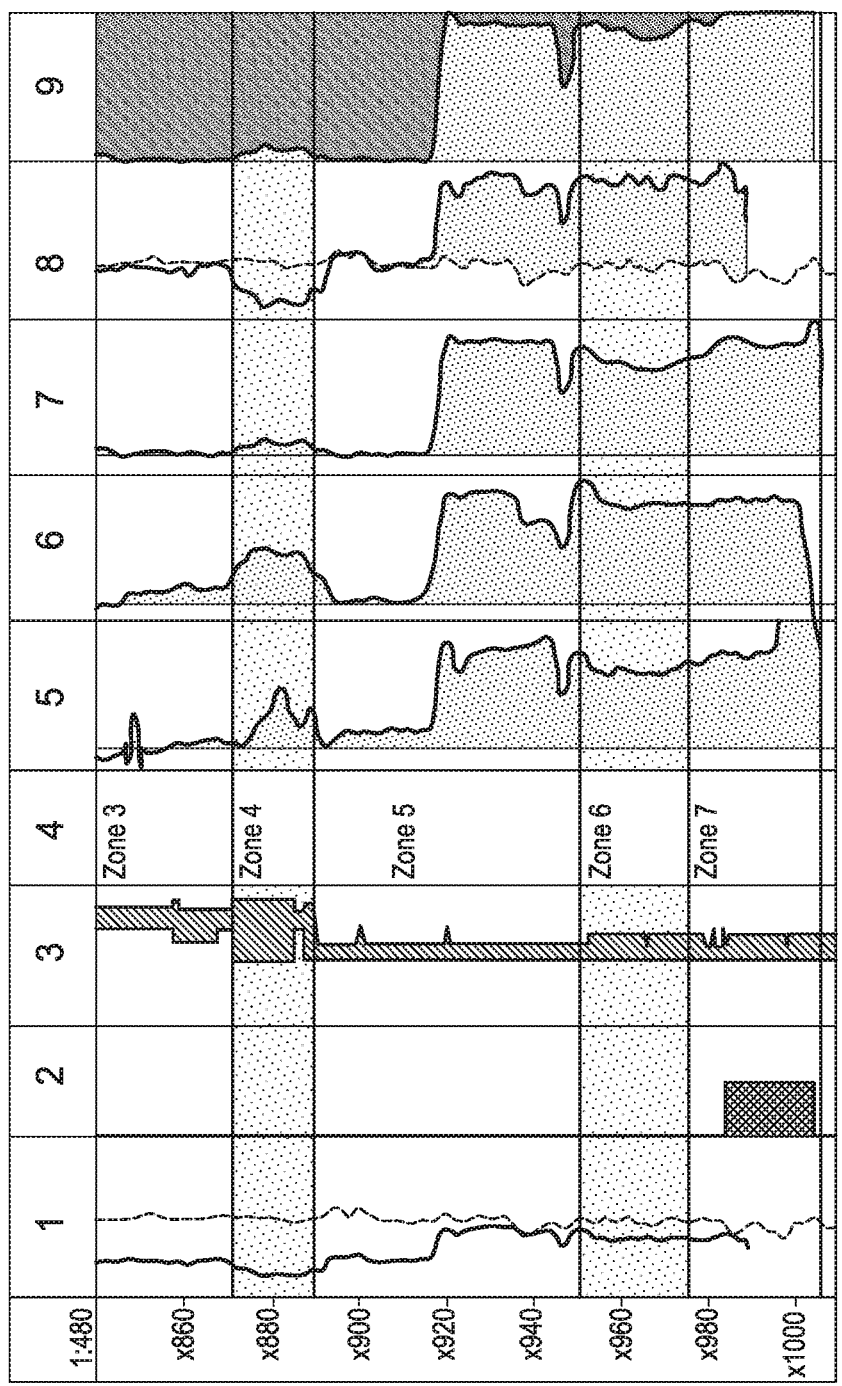
FIG. 2 is an exemplary pulsed neutron tool-based field well log for identification of untagged ceramic material in a gravel pack region of a wellbore. Various data collected in two detectors in the pulsed neutron tool during and between the neutron bursts are processed to develop the curves in the figure which are then utilized to detect gamma rays originating from ceramic gravel pack particles.

The use of some embodiments was demonstrated in a field well test, as illustrated in FIG. 2. In this well, $Gd_2O_3$ tagged ceramic proppant was packed between the outer well casing and an interior liner/screen. The well was also perforated and fractured before the gravel pack, as indicated in the figure. Therefore, the $Gd_2O_3$ tagged ceramic proppant was also placed in thin formation fractures due to the packing operation. The well was previously logged open hole and then logged with a dual-detector PNC logging tool combined with a natural gamma tool after the gravel pack had been emplaced. However, no logging was performed just before the gravel pack for the cased hole. After the gravel pack, the tool was run in background mode, CO mode and sigma mode. A cased hole natural gamma ray log was obtained, and a borehole sigma log and formation sigma log were obtained by resolving the borehole and formation component capture cross sections. Capture gamma ray detector count rates were computed during the sigma mode log. A gadolinium yield log was independently computed in both sigma mode and CO mode.

The logs available for analysis in FIG. 2 are: open hole natural gamma ray log and after-pack cased hole natural gamma ray log, when the neutron generator was off (track 1), perforation flag (track 2), pack mechanical assembly (track 3), silicon activation log (track 5), borehole sigma log (track 6), relative gadolinium yield log (track 7), open hole natural gamma ray log and normalized after-pack cased hole natural gamma ray log (track 8). The analyzed results of NRT proppant volume fraction are presented in track 9, shown in FIG. 2. The log presentation has been subdivided into 5 sub-intervals/zones (track 4) where there are differences in borehole tubules (zone 3 at top of log).

Observations:

The cased hole after gravel pack natural gamma ray log (GR_Gravel) when the neutron generator was off is shown in track 1, together with the open hole natural gamma ray log (GR_OH). It is seen that the un-normalized cased-hole natural gamma ray log after the gravel pack generally reads much lower than the open hole gamma ray log in non-packed depth intervals, due to the shielding from the casing and cement after the well was completed. However, in the packed interval, the cased hole natural gamma ray log reads about 30 API higher than in the other log intervals (making it read close to the open hole gamma ray log in packed interval). Moreover, the top of the gravel pack (at X917 ft) and the profile of the gravel pack (as indicated from the prior art GP indicating logs), agree well with the relative count rate increases from the after-pack cased hole natural gamma ray log.

The silicon activation gravel pack log in track 5 also shows a very clear gravel pack signal below x917 ft. Without being bound by theory, ceramic proppant contains a high concentration of silicon. However, the silicon activation logs may be somewhat affected by the neutron activation of other material, such as iron/manganese in zone 4, where the tubular wall thickness of the pack assembly is increased.

The borehole sigma log (track 6) shows a clear gravel pack signal below x917 ft, where the log increases significantly compared to the depth interval of blank pipe where no gravel pack signal is observed. The increase of borehole sigma in other depth intervals (such as zone 3, 4) are likely due to the increase of wall thickness of the fracture pack assembly, which is primarily made of iron and has a high thermal neutron absorption cross section. The decrease of the borehole sigma log in track 6 at x939 ft. is probably due to the significant decrease of the formation sigma at the same depth, since sigma-fm and sigma-bh are not totally independent parameters. However, the decrease of the borehole sigma log in track 6 at x947 ft. is due to incomplete gravel packing, as it is also indicated on other pack-indicating logs at same depth as well (such as the silicon activation log in track 5, the relative gadolinium yield log from track 7 and cased hole natural gamma ray log in track 1 and track 8).

The relative gadolinium yield log in the CO mode is shown in track 7. The relative gadolinium yield log show a good gravel signal below x917 ft. and is also cleaner in other zones (such as in zone 4), compared to borehole sigma log and the silicon activation log. The reason is that the relative gadolinium yield measurement is much less affected by the presence of iron in the borehole region than the borehole sigma measurement.

The cased hole after gravel pack natural gamma ray log in track 1 was normalized to the open hole natural gamma ray in the blank pipe interval where no gravel pack material is present to compensate for the attenuating effects from the casing and cement, and then compared to the open hole gamma ray log, the results are show in track 8. It is clear that, after log normalization, the comparison of (difference between) the normalized after-pack cased hole natural gamma ray and the open hole natural gamma ray log clearly indicates the gravel pack interval and profile (shaded in yellow). The top of gravel pack is about x917 ft and there is a void at x947 ft, consistent with the other GP logs. The normalized cased hole natural gamma ray in the depth interval of gravel pack is about 65 API higher than the open hole natural gamma ray. Since the logging speed of natural gamma ray log for this well is about 3 times faster than that of gadolinium yield log, the natural gamma ray log is slightly more statistical than the gadolinium yield log. In some embodiments, logging slower or use of the average of the repeat logs (to reduce the log statistical uncertainty) may be performed.

If an open hole natural gamma ray log (or a pre-pack cased hole gamma ray log) isn't available for comparison with the after pack log, and the zone of interest is known to have relatively constant gamma activity, a baseline can be drawn for the after-pack natural gamma ray log just above the gravel packed interval and then the gravel pack quality can be determined from the magnitude of the gamma increase above the baseline. In this situation, log normalization is not necessary. In this way, one can still get the top of gravel pack and the gravel fill in the annulus. However, the result may not be as quantitative as when using an open hole gamma log or pre-pack cased hole gamma log comparison with the after pack gamma log.

The gravel pack volume fraction (light crosshatching in track 9) is obtained by assuming no gravel pack (0%) at x910 ft. and the maximum gravel pack (100%) at x921 ft. Moreover, the volume differences in the annulus outside the blank pipe, the screen and the joints in the casing are corrected in the calculation of proppant volume fraction in the annulus. The unpacked volume fraction is shaded in blue color.

Based on the results obtained in this field test, it is clear that natural gamma ray log can be used to evaluate the gravel pack quality if naturally radioactive ceramic proppant is used for, or combined with, other gravel pack materials. Although NRT tagged ceramic proppant was used in this well to provide comparison between several GP indicating methods, ordinary ceramic proppant (non-NRT tagged proppant) or other conventional proppant mixtures would work equally well for gravel pack evaluation using a natural gamma ray tool, since the NRT tag does not affect the natural gamma log.

If the calibrator discussed above were filled with the naturally radioactive proppant used in this well, it would be possible to develop a relationship between the calibrator meter reading and the maximum gamma log increase (representing 100% fill) for this gravel pack geometry. It would also be possible to develop a relationship between the calibrator meter reading and the gamma log increases for different gravel pack volume filling percentages for a particular screen, casing, cement, and/or well geometry. The calibrator could then be employed to measure the gamma activity from an unknown sample of naturally radioactive proppant to be used in a future (geometrically similar) GP operation to predict from the calibrator meter reading what gamma ray log increase would correlate to a 100% fill, and then partial fill could be scaled to the percentage of the maximum gamma ray increase seen throughout the packed interval.

The foregoing detailed description is to be clearly understood as being given by way of illustration and example only, the spirit and scope of the present disclosure being limited solely by the appended claims.

What is claimed is:

1. A method for logging a well, comprising: obtaining a pre pack data set; utilizing a gravel pack slurry comprising a liquid and gravel pack particles to hydraulically place the particles into a gravel pack zone of a borehole penetrating a subterranean formation; obtaining a post gravel pack data set by: lowering into the borehole traversing the subterranean formation a gamma ray detector; and detecting gamma rays resulting from a native radioactivity of the gravel pack particles; comparing the post gravel pack data set and the pre gravel pack data set to determine the location of the gravel pack particles; and correlating the location of the gravel pack particles to a depth measurement of the borehole to determine the location, height, and/or percent fill of gravel-pack particles placed in the gravel pack zone of the borehole.

2. The method of claim 1, wherein the gravel pack particles are formed from a raw material having the native radioactivity.

3. The method of claim 2, wherein the raw material is clay.

4. The method of claim 3, wherein the clay is selected from the group consisting of kaolin, bauxite, and any mixture thereof.

5. The method of claim 4, wherein the native radioactivity is provided by the clay comprising uranium, thorium, potassium, radium, or a combination thereof.

6. The method of claim 1, wherein the gravel pack particles do not contain boron, cadmium, gadolinium, samarium, or iridium.

7. The method of claim 1, wherein a first portion of the gravel pack particles contains a thermal neutron absorbing material and a second portion of the gravel pack particles does not contain a thermal neutron absorbing material.

8. The method of claim 1, further comprising:
obtaining the pre gravel pack data set by: lowering into the borehole traversing the subterranean formation a gamma ray detector; and detecting gamma rays, wherein the pre gravel pack data set is obtained prior to placing the particles into the gravel pack zone of the borehole.

9. The method of claim 8, further comprising normalizing the pre gravel pack and post gravel pack data sets for differences in borehole conditions prior to comparing the pre gravel pack and post gravel pack data sets.

10. The method of claim 9, wherein the normalizing the pre gravel pack and post gravel pack data sets comprises comparing an after-pack cased hole natural gamma ray log with an open hole natural gamma ray log.

11. A method for logging a well, comprising: obtaining a pre cement data set; utilizing a cement slurry comprising a liquid and solid particles to cement one or more well tubulars in place in a borehole penetrating a subterranean formation;
obtaining a post cement data set by: lowering into the borehole traversing the subterranean formation a gamma ray detector; and detecting gamma rays resulting from a native radioactivity of the solid particles; comparing the post cement data set and the pre cement data set to determine the location of the solid particles; and correlating the location of the solid particles to a depth measurement of the borehole to determine the location, axial distribution, radial distribution, and/or height of the cement slurry placed in the cemented zone of the borehole.

12. The method of claim 11, wherein the clay is selected from the group consisting of kaolin, bauxite, and any mixture thereof.

13. The method of claim 11, wherein the solid particles do not contain boron, cadmium, gadolinium, samarium, or iridium.

14. The method of claim 11, wherein a first portion of the solid particles contains a thermal neutron absorbing material and a second portion of the solid particles does not contain a thermal neutron absorbing material.

15. The method of claim 11, further comprising: obtaining the pre cement data set by: lowering into the borehole traversing the subterranean formation a gamma ray detector; detecting gamma rays, wherein the pre cement data set is obtained prior to cementing the one or more well tubulars in place in the borehole.

16. The method of claim 15, further comprising normalizing the pre cement and post cement data sets for differences in borehole conditions prior to comparing the pre cement and post cement data sets.

17. The method of claim 16, wherein the cement slurry is free of iridium.

18. The method of claim 11, wherein the native radioactivity is provided by the clay comprising uranium, thorium, potassium, radium, or a combination thereof.

* * * * *